United States Patent [19]

Shahid

[11] Patent Number: 5,286,788
[45] Date of Patent: Feb. 15, 1994

[54] THIOESTER POLYMERIZATION MODIFIERS

[75] Inventor: Mohammed Shahid, Minneapolis, Minn.

[73] Assignee: Witco Corporation, New York, N.Y.

[21] Appl. No.: 999,454

[22] Filed: Dec. 29, 1992

Related U.S. Application Data

[63] Continuation of Ser. No. 679,740, Apr. 3, 1991, abandoned.

[51] Int. Cl.$^5$ .............................................. C08G 63/91
[52] U.S. Cl. ........................................ 525/23; 525/43; 525/437; 525/438; 525/445; 525/451; 524/303
[58] Field of Search .................. 525/23, 43, 437, 438, 525/445, 451; 524/303

[56] References Cited

U.S. PATENT DOCUMENTS

| | | | |
|---|---|---|---|
| 2,519,755 | 8/1950 | Gribbins | 524/303 |
| 3,567,076 | 2/1971 | Kauder | 260/870 |
| 3,773,723 | 11/1973 | Cole | 524/303 |
| 4,321,191 | 3/1982 | Minagawa et al. | 524/285 |

FOREIGN PATENT DOCUMENTS

| | | |
|---|---|---|
| 0147727 | 7/1985 | European Pat. Off. . |
| 1560846 | 2/1969 | France . |
| 2162926 | 6/1973 | France . |
| 1407072 | 9/1975 | United Kingdom . |

OTHER PUBLICATIONS

Chemical Abstracts 66:38447b.
Chemical Abstracts 71:125186n.
Chemical Abstracts 71:102582z.
Chemical Abstracts 77:36011h.
Chemical Abstracts 77:90159a.
Chemical Abstracts 77:115456k.
Chemical Abstracts 83:79735p.
Chemical Abstracts 84:32028r.
Chemical Abstracts 88:171181f.
Chemical Abstracts 90:123261b.
Chemical Abstracts 93:27368h.
Chemical Abstracts 96:218805v.
Chemical Abstracts 108:23447p.
Chemical Abstracts 109:150673e.

Primary Examiner—John Kight, III
Assistant Examiner—S. A. Acquah
Attorney, Agent, or Firm—Lockwood, Alex, FitzGibbon & Cummings

[57] ABSTRACT

A composition and method for the polymerization of polymerizable resins which undergo exothermic polymerization, including unsaturated polyester resins, vinyl ester resins and mixtures thereof, and the polymerized product thereof, wherein an ester of a thiocarboxylic acid is present in a effective amount to substantially reduce the exothermic heat generated during polymerization of the resin, but insufficient to substantially affect the degree or rate of polymerization of the resin. The preferred thioester has the formula $$Z-S_a-C_bH_{2b-n}-[\overset{O}{\underset{\|}{C}}-OR]_{n+1}$$

in which Z is an alkyl having 1-18 carbon atoms or $$-C_bH_{2b-n}-[\overset{O}{\underset{\|}{C}}-OR]_{n+1}$$

a is 1 or 2, b is a whole number from 1 to about 5, n is a whole number from zero to b, and R is an alkyl or hydroxyalkyl having 1-18 carbon atoms and zero to 2 hydroxyl groups, alkyloxyethyl, alkyloxyethoxyethyl, and alkyloxypolyethoxyethyl having 1 to about 30 carbon atoms in the alkyl group; or when n is zero and z is alkyl, R is $$-Y\overset{O}{\underset{\|}{O C}}-C_bH_{2b}-S-_aZ$$

in which Y is an alkylene group having 2 to about 20 carbon atoms or an alkylene group interrupted at intervals of 2 or more carbon atoms by oxygen atoms and having 4 to about 40 carbon atoms and one to 19 oxygen atoms. Preferred specific thioesters include ditridecyl thiodipropionate, dimethyl thiodipropionate, and dimethyl dithiodipropionate.

33 Claims, No Drawings

THIOESTER POLYMERIZATION MODIFIERS

This application is a continuation of application Ser. No. 07/679,740, filed Apr. 3, 1991, now abandoned.

BACKGROUND AND SUMMARY OF THE INVENTION

The present invention relates to modification of the polymerization of resins with a thioester and, more particularly, to a composition, product and method in which an ester of a thiocarboxylic acid is utilized to modify the polymerization of unsaturated polyester and/or vinyl ester resins to reduce the exothermic heat produced thereby.

Plastics based upon unsaturated polyester resins and/or vinyl ester resins have enjoyed wide spread use in industry for a number of years. They have been used as polymers or copolymers, either with or without fillers or other reinforcement materials, such fiberglass, in the manufacture of a broad range of products including boats, building panels, structural parts for automobiles and aircraft, appliances, fishing rods, golf club shafts, buttons, cultured marble and bowling balls to name a few.

Such resins are typically liquid at room temperature and usually comprise an unsaturated polyester and/or vinyl ester prepolymer, a cross linking monomer and one or more stabilizers which prevent premature polymerization of the resin mixture. When the resins are exposed to free radicals, such as when they are catalyzed with an appropriate catalyst typically a peroxide, they polymerize to the final polymer product. This polymerization is exothermic in nature generating substantial quantities of heat which substantially raise the temperature of the polymerizing mass during the course of its polymerization. Although some of this additional heat is desirable to drive the polymerization to completion, the amount of heat generated and the peak temperatures reached do play an important role and frequently are detrimental to the physical strength, aesthetics and other properties of the final polymerized product. High exothermic temperatures increase the internal and external stresses in the polymerized product frequently resulting in warpage, microcracking on the surface and cracks in thicker cross section products, reinforcing fiber prominence or show through, darker color and inferior physical strength among some of the undesirable effects.

Various additives have been employed in the past for the purpose of lowering the exothermic energy which is generated during the polymerization of these resins in an attempt to avoid these undesirable effects. These additives have included a methyl styrene and Zelac Nu, a product of DuPont, as well as various additives which are derivatives of phosphoric acid. However, these additives achieve exothermic energy suppression by retarding the polymerization reaction itself, thereby drastically affecting the physical, electrical and chemical resistance properties of the polymerized product.

Various wetting and air release agents have also been utilized in the polymerization of these resins particularly where the polymerized resins function as binders for fillers and/or reinforcing fibers. Such agents have typically been of low molecular weight organic compounds which do not participate in the cross linking reaction and, thereby, remain trapped in the resin matrix. As such, these agents also detrimentally affect the chemical and weather resistance, as well as the electrical properties of the polymerized product. Functional additives, such as silanes and titanates which are also useful for this purpose are not typically used due to their excessive cost. Organic phosphate and phosphite compounds and some fatty acids and their derivatives have also been used in the past for their excellent wetting and air release qualities. However, they too have detrimental effects on the adhesion of the resin matrix to fillers and reinforcing materials, on paint adhesion and on other adhesives and gel coatings. Moreover, organic phosphate and phosphite containing organic compounds also retard the cross linking reaction, thereby negatively affecting the physical, electrical and chemical resistance properties of the polymerized product.

The polymerization modifiers of the present invention overcome the foregoing disadvantages which are experienced in the use of the foregoing additives. The polymerization modifier additives of the present invention:

1. Are active ingredients during the cross linking polymerization reaction to reduce the exothermic energy and heat of the reaction without affecting the degree of polymerization or its rate, thereby improving product quality;

2. Resist against thermal oxidation during the cross linking polymerization reaction which, together with the reduction in exothermic energy, results in a lighter color polymerized product, thereby functioning as a color control agent and improving product quality;

3. Function as wetting agents for wetting fiber reinforcement and filler materials, thereby improving processing performance;

4. Function as an air release agent due to their polar organic structure, thereby also improving processing performance;

5. Function as a synergist for thermal oxidation resist agents, thereby improving product quality;

6. Function as a synergist for ultraviolet and light stabilizing agents, thereby improving product quality;

7. Function as a stabilizer for the processing and storing of the resins prior to polymerization; and 8. Function to reduce the volatilization of styrene monomers during the polymerization or curing of the resins and, thus, reduce the presence of styrene in the work environment.

In one principal aspect of the present invention, a polymerizable resin composition, a method of polymerizing a polymerizable resin and a polymerized product produced thereby include at least one polymerizable resin which undergoes exothermic polymerization and which is selected from the group consisting essentially of unsaturated polyester resins, vinyl ester resins and mixtures thereof, and an ester of a thiocarboxylic acid which is mixed with the resin in an effective amount to substantially reduce the exothermic heat generated during polymerization of the resin, but insufficient to substantially affect the degree or rate of polymerization of the resin.

In another principal aspect of the present invention, the ester of a thiocarboxylic acid has the formula

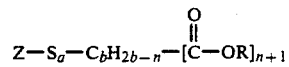

in which Z is an alkyl having 1–18 carbon atoms or

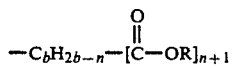

a is 1 or 2, b is a whole number from 1 to about 5, n is a whole number from zero to b, and R is an alkyl or hydroxyalkyl having 1-18 carbon atoms and zero to 2 hydroxyl groups, alkyloxyethyl, alkyloxyethoxyethyl, and alkyloxypolyethoxyethyl having 1 to about 30 carbon atoms in the alkyl group; or when n is zero and Z is alkyl, R is

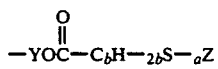

in which Y is an alkylene group having 2 to about 20 carbon atoms or an alkylene group interrupted at intervals of 2 or more carbon atoms by oxygen atoms and having 4 to about 40 carbon atoms and one to 19 oxygen atoms.

In still another principal aspect of the present invention, R is methyl or tridecyl.

In still another principal aspect of the present invention, the foregoing ester of a thiocarboxylic acid is a thiopropionate, and preferably a thiodipropionate.

In still another principal aspect of the present invention, the foregoing ester of a thiocarboxylic acid is ditridecyl thiodipropionate.

In still another principal aspect of the present invention, the foregoing ester of a thiocarboxylic acid is dimethyl thiodipropionate.

In still another principal aspect of the present invention, the foregoing ester of a thiocarboxylic is dimethyl dithiodipropionate.

In still another principal aspect of the present invention, the ester of a thiocarboxylic acid is present in an amount of about 0.001-5.0% by weight of the resin, and preferably about 0.5-1.0% by weight of the resin.

One family of resins for which the thioester modifiers of the present invention are preferred as a polymerization modifier additive is the unsaturated polyester resins. These resins prior to polymerization are typically liquid at room temperature and have viscosities ranging from a few cps up to a 10,000 cps.

The prepolymers of unsaturated polyester resins are typically formed by the condensation between glycols and diacids/anhydrides which upon condensation yield the unsaturated polyester prepolymer and water according to the following general equation

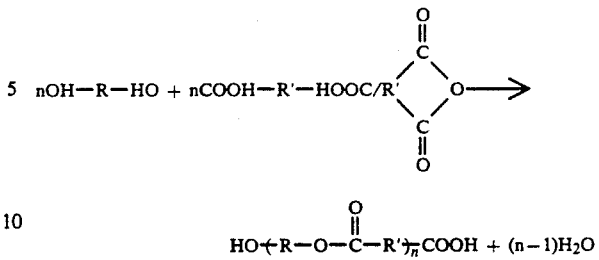

and wherein R may be ethylene glycol, propylene glycol, diethylene glycol, hydrogenated bisphenol, dipropylene glycol, trimethylolpropane diol and the like, and R' may be maleic anhydride, phthalic acid/anhydride, fumaric acid, isophthalic acid, terephthalic acid, adducts of maleic anhydride with dicyclopentadiene, adipic acid and the like. The polyester prepolymers produced by this condensation reaction are unsaturated polyesters. Commercially available unsaturated polyesters are typically based on maleic anhydride.

These unsaturated polyester prepolymers are then dissolved in a cross linking monomer to form the resin which is to be ultimately polymerized. The cross linking monomers are typically liquid organic compounds containing C=C groups. A preferred cross linking monomer is styrene. However, other cross linking monomers which may be used include vinyl toluene, diallyl phthalate, acrylates, methacrylates, divinyl benzene, alpha methyl styrene and others.

Another family of resins with which the thioester modifiers of the present invention are preferred as a polymerization modifier additive is the vinyl ester resins. These resins are also typically liquid at room temperature and their viscosities also range from a few cps up to about 10,000 cps. Vinyl ester prepolymers are typically formed by the reaction between an epoxy and acrylic/methacrylic acid to yield the vinyl ester prepolymer. An example of such reaction is

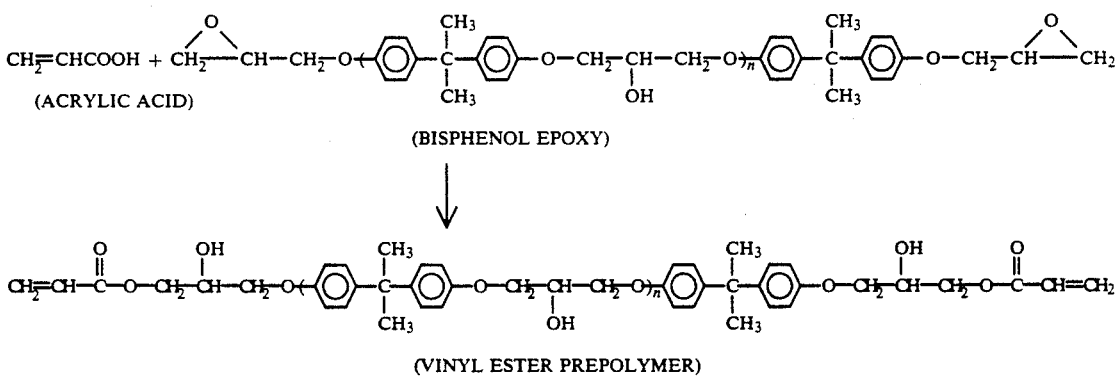

of the present invention are preferred as a polymerization modifier additive is the unsaturated polyester resins. These resins prior to polymerization are typically liquid at room temperature and have viscosities ranging from a few cps up to a 10,000 cps.

The vinyl ester resin is formed by the addition of the cross linking monomer to the vinyl ester prepolymer. Again, styrene is predominantly used as the cross linking monomer in these resins, but the other cross linking monomers, such as those previously described for the unsaturated polyester resins, may also be used as the cross linking monomer for special applications.

The vinyl ester resins for reinforced plastic concentrates are generally based on the vinyl ester prepolymer of bisphenol A epoxy and methacrylic acid.

Various other additives may also be included in the foregoing resins to prevent premature cross linking of the polymer and monomer during storage and before final polymerization is to be initiated. These additives are generally called stabilizers, and the thioesters of the present invention also typically perform this stabilizer function. Thus, the thioester of the present invention may be mixed with the resins prior to storage of the resins before their use.

Final polymerization of the foregoing resins occurs in the presence of free radicals which cross link the cross linking monomers, such as styrene, with the polymers via C=C bonds to form a three dimensional network structure. The resultant polymerized product is a rigid and hard substance and is thermosetting in nature. In the case of the unsaturated polyester resins, the final polymerized structure generally takes the form

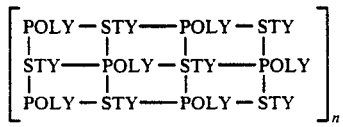

wherein POLY is the unsaturated polyester and STY is the styrene cross linking monomer.

In the case of the vinyl ester resins, the fully polymerized resultant material generally has the structure

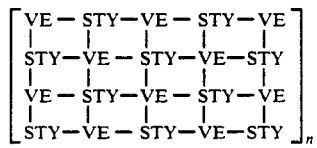

wherein VE is the vinyl ester and STY is the styrene monomer.

The free radicals for the cross linking reactions are mainly generated by the decomposition of organic peroxides. There are generally three methods used to achieve this. They are:

1) thermal decomposition;
2) oxidation reduction induced decomposition; and
3) radiation induced decomposition.

In the thermal decomposition method, the temperature of the resin is elevated to a level to cause the organic peroxides to decompose and form free radicals. These organic peroxides typically are referred to as a catalyst. Usually the peroxides are added to the resins prior to processing the products. The processing is facilitated with the provision of heat at a specific temperature. The processing which uses this approach is known as the high temperature curing process. Some of the organic peroxides used in this process typically include benzoyl peroxide, t-butyl peroctoate, t-butyl perbenzoate, cumenehydroperoxide and others.

In the oxidation reduction induced decomposition method, the polymerization is initiated at room temperature or below. This is accomplished by accelerating the decomposition rate of the organic peroxides, such as methyl ethyl ketone peroxide, benzoyl peroxide, 2,4 pentanedioneperoxide and others, by the addition of organic metal salts, such as cobalt napthenate, cobalt octoate, copper napthenate, potassium hexacem and others, amines such as dimethyl aniline, diethyl aniline, dimethyl-p-toluidine, N, N dimethylacetoacetamide, acetylacetone and other organic compounds. These chemical compounds are known as promoters or accelerators. Usually accelerators are added to the resin prior to polymerization of product, and the catalysts are added at the time final polymerization is to be initiated. The processing which uses this approach is known as room temperature curing.

In the radiation induced decomposition method, certain organic compounds are decomposed by exposure to radiation energy to form free radicals. These compounds include carbonyl compounds such as benzoins, quinones and benzophenones, azo compounds such as diazoniums, organic sulfur compounds such as merceptans and disulfides, redox systems such as peracids and iron containing compounds, organometallics, metal carbonyls and photoconductors such as zinc oxide. Ultraviolet light curing of a thin coating is a good example of this phenomenon. RF and IR heating may also be employed to initiate the cross linking reaction by heating the resins.

In all of these free radical catalyzed methods for the final cross linking polymerization reactions, the reaction typically proceeds in an exothermic fashion with the release of considerable amounts of exothermic energy. Consequently, the temperature of the reaction materials rises substantially as the reaction proceeds reaching a peak temperature at some point before the reaction has completed.

The cross linking reaction mechanism is the most important aspect in the manufacture of the polymerized final product, because the cross linking reaction and processing are occurring simultaneously. Some of the more important aspects of this cross linking reaction mechanism which play key roles in the quality of the product are:

a) Induction period (gel time);
b) Resin flow and its wetability of the reinforcement or filler materials;
c) Internal and external stresses; and
d) Exothermic temperature.

The induction period is a time interval between liquid state and gel state of the resin during the cross linking reaction. This is important because it controls the resin's flow and its wetability of fillers and reinforcing materials. The induction time can be designed for the predicted length of time for room temperature cure, but for high temperature curing it is not easily designed because the induction time is very short. A very long induction period tends to poison the cross linking reaction and its degree of polymerization. The induction period is tailored by adding organic compounds which are known as inhibitors, such as parabenzoquinone, hydroquinone, monotertbutyl hydroquinone, tertbutyl cathecol, toluhydroquinone, butylated hydroxytoluene, hindered phenols, hindered amines and others.

Exothermic temperatures and heat of the reaction also play an important role in the physical strength and aesthetics of the product. Lower exothermic temperatures are desirable because higher exothermic temperatures increase internal and external stresses in the product resulting in warpage, microcracking on the surface and cracks in thicker cross sections, fiber prominence or print through, darker color and inferior physical strengths. However, sufficient heat is still required to drive the reaction toward completion. For special cases, such as in thicker cross section products, the lowering of the exothermic temperature has been achieved in the past by retarding the cross linking reaction. This results in dull surfacing, inferior physical strength in general, and in inferior chemical resistance in particular.

The thioester modifier additives of the present invention have been found to be remarkable because they allow the cross linking reaction to proceed at lower exothermic heat energy release, thereby resulting in lower exothermic temperatures during the cross linking process. Yet, they do not substantially affect the rate or degree of cure, and they result in lighter color resin matrix products. And, the thioester additives of the invention, unlike additives which have been previously employed for the suppression of exothermic energy and temperature during the cross linking polymerization and/or as wetting and air release agents, are active ingredients which are chemically bonded into the polymer. Thus, unlike the prior additives, they result in a final product which has superior strength and other characteristics and properties.

The thioester modifier additives of the present invention have also been found to resist against thermal oxidation and to function as superior wetting and air release agents, particularly where the polymerization resins act as binders for fillers and reinforcing materials. They also act as a synergist for thermal oxidation resist agents and ultraviolet and light stabilizing agents, and themselves act as stabilizers of the resins during storage. Thus, it is preferred to add the thioester additives to the resins for storage, and before polymerization is to be initiated.

Fiberglass materials based on unsaturated polyester and vinyl ester resins are predominantly manufactured by the spray-up process in an open mold. This results in a concern with compliance with governmental regulations in terms of ambient air levels of the styrene monomer. Styrene monomer loss occurs in this process during spraying, wetting of the fiberglass and curing of the resin. Styrene loss in the spraying and wetting is strictly due to diffusion phenomena. The diffusion rate is dependent upon the vapor pressure of the resin system and ambient temperature. Higher thixotropic index (the ratio of the resin system's viscosities at low and high shear rate) minimizes the styrene loss during this segment of the process. Also styrene loss which occurs during the resin curing is predominantly due to volatilization of styrene from the exothermic reaction of resin curing. Such styrene loss can be minimized by the presence of the thioesters of the present invention.

In the present invention the preferred polymerization modifier additives are thioesters which are mixed into the unsaturated polyester and/or vinyl ester resins on or before initiation of the final cross linking polymerization reaction. These thioesters are preferably esters of thiocarboxylic acids. More preferably they have the formula

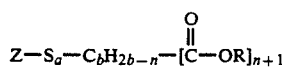

in which Z is an alkyl having 1-18 carbon atoms or

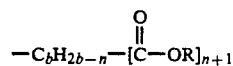

a is 1 or 2, b is a whole number from 1 to about 5, n is a whole number from zero to b, and R is an alkyl or hydroxyalkyl having 1-18 carbon atoms and zero to 2 hydroxyl groups, alkyloxyethyl, alkyloxyethoxyethyl, and alkyloxypolyethoxyethyl having 1 to about 30 carbon atoms in the alkyl group; or when n is zero and Z is alkyl, R is

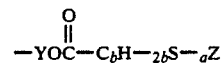

in which Y is an alkylene group having 2 to about 20 carbon atoms or an alkylene group interrupted at intervals of 2 or more carbon atoms by oxygen atoms and having 4 to about 40 carbon atoms and one to 19 oxygen atoms.

Exemplary thioesters of the invention include:

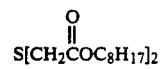

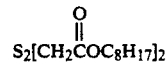

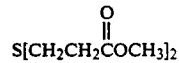

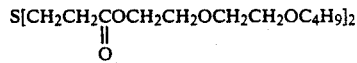

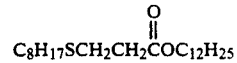

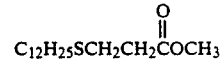

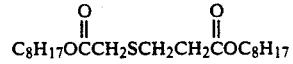

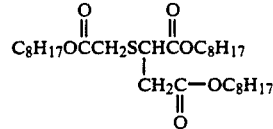

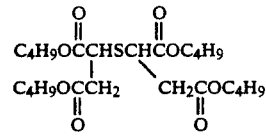

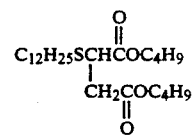

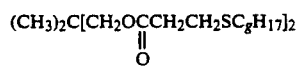

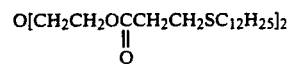

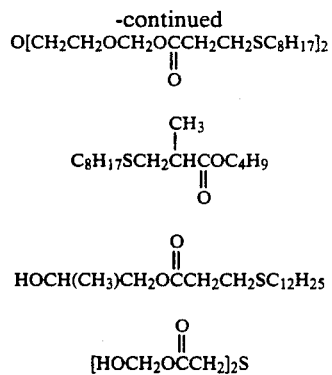

Preferred specific thioesters include thiopropionates, more specifically thiodipropionates, and still more specifically ditridecyl thiodipropionate, dimethyl thiodipropionate, and dimethyl dithiodipropionate. In certain instances it is preferred that the aforementioned R groups be hydroxyalkyls to enhance the resin's thixotropic index.

The foregoing thioesters may be added in amounts from about 0.001-5.0% by weight of the resin, and preferably from about 0.5-1.0% by weight of the resin.

As previously mentioned, unsaturated polyester plastics enjoy wide spread use in the manufacture of a broad spectrum of products, including boats, building panels, structural parts for automobiles and aircraft, appliances, fishing rods, golf club shafts and others. Approximately 80% of these resins made in the U.S. are used with reinforcing agents, primarily fiberglass. Applications that do not involve reinforcing agents include buttons, furniture casting, culture marble and auto body putty. Thus, in contrast to many other plastics which are based on a single prime ingredient, the polyester resins that are used in reinforced plastics contain substantial amounts of several components including resin, catalyst, promoter, additive, filler and fiber reinforcement. These components can be combined in different ratios, and furthermore, an alternate material can be substituted for each component. Consequently many different types of polyester resins are available. In each type formulators strive to emphasize the particular properties needed for specific applications.

The following is a summary of some of the classifications of these resins:

1. General Purpose: This type of the resin is used where chemical and flame resistance are not required for the application. Generally this type of resin is used in the room temperature curing process.

2. Flexible Resin: This resin is typically used in furniture (cast) and auto body putty.

3. Resilient Resin: This resin is used where toughness is required, such as in bowling balls, safety helmets, guards, aircraft and automotive parts and gel coats.

4. Low profile Low Shrink Resin: This type of resin is used mostly for sheet molding and bulk molding compounds.

5. Weather Resistance Resin: This type resin is designed and formulated to have resistance to yellowing on exposure to sunlight and indoor light. Resins of this type are used in gel coat, outdoor structural panels, skylights and culture marble.

6. Chemical Resistance Resin: This type of resin is typically used in the manufacture of chemical processing equipment, fume hoods, reaction vessels, tanks and pipes.

7. Fire Resistant Resin: Fire resistant resin is typically used in the manufacture of fume hoods, electrical equipment, building panels, as well as certain types of boats.

Unlike unsaturated polyester resins, vinyl ester resins possess a low ester content and a low vinyl functionality. This results in greater resistance to hydrolysis and in superior fatigue resistance. They also yield lower shrinkage upon cure.

At present, the largest commercial use of vinyl ester resin is in chemical resistant reinforced plastic composite materials. They offer excellent acid, base and solvent resistance over wide temperature ranges. Vinyl ester resin based composites have demonstrated economy and better price to performance characteristics than steel and it's alloys in many corrosive environments. Because of their epoxy like fatigue resistance properties, they are used in leaf springs for automotive applications, non-critical aerospace structural components and the construction of small airplanes.

In general, the thioester additives of the present invention improve these resins, performance in most if not all of the foregoing applications, for example as to weatherability, thermal oxidation resistance, impact resistance, electrical properties and physical strength at elevated temperatures. The thioester additives of the present invention also act as a synergist for thermal oxidation resist agents and for ultraviolet resistant agents.

The following are some of the specific advantages of the thioesters of the invention when used in some of these specific applications.

In filled and/or reinforced plastic composite products, the thioesters of the invention play an important role as unique wetting and potential air release agents by decreasing the surface tension of the resin solution. The thioesters are unique because, upon curing, they become a part of the resin matrix and, therefore, do not result in any harmful effect on the performance of the reinforced materials.

In bulk molded materials, parts of the product may be thicker than the rest of the configuration. Excessive exothermic heat tends to cause these thicker portions to crack or diesel (burning effect). Thicker cross section parts are not economically feasible because of the very long cycle time due to curing at lower temperatures, and the danger of exothermic cracking. The thioesters of the invention help to alleviate these problems by reducing exothermic heat and, consequently, improving productivity rates. Also, pigmentation and coloring in these materials is usually an important factor. A lighter color cured resin matrix is realized by the thioesters of the invention which will result in improved color depth and opens more choices for varieties of color schemes.

Wetting agents also play an important role in the quality of bulk molded materials, because these materials may contain up to 70% by weight fillers. Filler wetting by the resin is necessary for electrical, chemical and physical strength and aesthetics of these materials. The thioesters of the invention play an important role as a wetting agent in these materials.

The thioesters also act as a synergist for thermal oxidation resist agents to improve the electrical properties and performance at higher temperatures of bulk molded materials, and as a synergist for ultraviolet resist agents for outdoor applications.

In sheet molded materials, the thioesters of the invention decrease the cycle time and maintain the surface smoothness by virtue of exothermic suppression. The current Class A surface sheet molded compound curing technology yields curing of these materials in 60-90 seconds at 290°-310° F. mold temperature. In order for this material to compete with other materials, such as ultraviolet resist agents are also valuable in this application.

In Table 1, the above applications as well as additional applications are listed, and at least some of the beneficial attributes in those applications are also identified which are enjoyed by the thioesters of the invention.

TABLE 1

| | | PERFORMANCE ATTRIBUTES OF THE THIOESTERS | | | | |
|---|---|---|---|---|---|---|
| PROCESSING METHODS | CURING PROCESS | EXOTHERM SUPPRESSING AGENT | COLOR CONTROL AGENT | WETTING AGENT | AIR RELEASE AGENT | STABI-LIZER |
| REINFORCED MOLDING COMPOUNDS | | | | | | |
| A) Sheet Molding Compounds | HIGH TEMP. | X | | X | X | X |
| B) Bulk Molding Compounds | HIGH TEMP. | X | X | X | X | X |
| RESIN TRANSFER MOLDING | ROOM TEMP. | X | | X | X | X |
| MAT AND PRE-FORMED MOLDING | HIGH TEMP. | X | X | X | X | X |
| HAND LAY UP/SPRAY UP | ROOM TEMP. | X | X | X | X | X |
| CULTURED SYNTHETIC MARBLE | HIGH/ROOM TEMP. | X | X | X | X | X |
| PULTRUSION | HIGH TEMP. | X | | X | | |
| POLYMER CONCRETE | ROOM TEMP. | X | | X | X | X |
| PANELS | HIGH TEMP. | X | X | X | X | X |
| FILAMENT WINDING | HIGH/ROOM TEMP. | X | | X | X | X |
| BAG MOLDING | HIGH/ROOM TEMP. | X | X | X | X | X |
| COLD MOLDING | ROOM TEMP. | X | X | X | X | X |
| SPECIAL NON-REINFORCED MATERIALS | | | | | | |
| GEL COTE | ROOM TEMP. | | X | X | X | X |
| AUTO BODY PUTTY | ROOM TEMP. | | | | | X |
| BOWLING BALLS | HIGH TEMP. | X | | X | X | X | nylon and polyurethane reaction injection molding and engineering thermoplastics injection molding materials, the curing time should be less than 60 seconds. The curing at 320°-330° F. results in a 60 second cure, but the surface of the sheet molded compounds suffers from microcracking, waviness and increased incidence of blistering. The addition of thioesters of the invention to these compounds permits them to be molded at 320°-330° F. without the aforementioned problems.

Also the amount of filler used in sheet molded materials is important for the surface smoothness and the low profile and low shrink of these materials. Higher filler content yields smoother surfaces in these materials, but the amount of filler is restricted by the resin mixture's ability to wet the fiber reinforcement. The superior wetability properties of the thioesters of the invention permits a higher filler content and its air release ability minimizes air entrapment which is one of the causes of blistering.

In high temperature mat and preform molding, the thioesters of the invention reduce cracking, lower internal stresses, improve physical strength and fatigue resistance and improve aesthetic appearance due to exothermic suppression. The thioesters will also improve color control from batch to batch by producing a lighter colored matrix. The superior properties of the thioesters for wetting, air release and synergism with thermal oxidation resist agents for electrical and higher temperature application, and synergism with ultraviolet resist agents for outdoor applications is also advantageous in sheet molding applications.

In room temperature curing resin transfer and in injection molding, the thioesters of the invention reduce exothermic cracking, speed curing, and improve physical strength attributes and productivity rates by virtue of exothermic suppression. Their wetting and air release abilities, and their synergism with thermal oxidation and The following examples are given as illustrative of the invention.

EXAMPLE 1

Redox Initiated Polymerization (room or below room temperature curing process)

100 g of resin was catalyzed in a paper cup using 1% organic methyl ethyl ketone peroxide to polymerize at 77° F. The liquid resin changed to a gelled state mass and the time required to reach this state was the gel time. The polymerization was an exothermic reaction which increased the temperature of the resin as it proceeded. This temperature was recorded against time using a J type thermocouple and the time to reach maximum temperature was the peak time. The maximum temperature recorded was the peak temperature.

Two resins were separately so polymerized. One of the resins was Altek 52 and the other was Altek 80-70 LV. Both of these resins are accelerated (prepromoted) unsaturated polyester resins available from Alpha Chemical Corporation, Tenn.

Two such polymerizations were performed for each resin. In one, the control, nothing further was added to the polymerizing resin. In the other 0.5% by weight of the resins of a thioester in the form of ditridecyl thiodipropionate (DTDTDP) was added to the resin prior to initiation of the polymerization reaction.

The results were as follows:

| | Altek 52 | | Altek 80-70 LV | |
|---|---|---|---|---|
| | Control | DTDTDP | Control | DTDTDP |
| Gel Time | 12 min. | 11 min. | 17 min. | 17 min. |
| Peak Time | 19 min. | 18 min. | 28 min. | 26 min. |
| Peak Temp. | 334° F. | 268° F. | 334° F. | 268° F. |

This example reveals that ditridecyl thiodipropionate (DTDTDP) has no substantial effect on either gel or peak times, but substantially suppresses exothermic energy and temperature.

EXAMPLE 2

Thermally Decomposed Free Radical Polymerization (high temperature curing process)

This test was an SPI reactivity test which establishes the reactivity characteristics of unsaturated polyester and vinyl ester resins. The unsaturated polyester resin was MR 14019 from Aristeck Chemicals, and the vinyl ester resin was Derakane 470-36 from Dow Chemical.

In this test the catalyzed resin was polymerized at an elevated temperature of 180° F. The resins were catalyzed with 1% by wt. of the resins of benzoyl peroxide. Approximately 15g of the catalyzed resin was polymerized in a test tube in a circulating oil bath maintained at 180° F. The temperature of the resin was measured using a J type thermocouple and recorded against time.

Initially the temperature of the resin was increased due to heat transfer until it reached 150° F. At 150° F. the benzoyl peroxide starts to decompose at a moderate rate and polymerization cross linking starts to take place and generates heat. The exothermic heat and the heat from the oil bath increases the temperature of the resin, until the resin reaches 190° F. At this temperature benzoyl peroxide decomposes rapidly and consequently rapid polymerization occurred which caused a sudden rise in resin temperature. This rise in temperature attained a maximum level. The level of maximum temperature was used to determine the reactivity of the resins. Two sets of tests were run for each unsaturated polyester resin (ISO Molding Resin) and vinyl ester resin (V.E. Molding Resin) with and without (the control) the addition of ditridecyl thiodipropionate (DTDTDP) thioester, 0.5% by wt. of the resins.

Parameters of the Test

Gel Time: Time interval between 150° F. and 190° F.
Peak Time: Time interval between 190° F. and maximum temperature.
Peak Temp.: Maximum temperature.

The results were as follows:

| | SPI Reactivity | | | |
|---|---|---|---|---|
| | Unsaturated Polyester | | Vinyl Ester | |
| | Control | DTDTDP | Control | DTDTDP |
| Gel Time | 6 min 0 sec | 6 min 30 sec | 6 min 16 sec | 6 min 15 sec |
| Peak Time | 90 sec | 90 sec | 133 sec | 150 sec |
| Peak Temp. | 430° F. | 360° F. | 425° F. | 362° F. |

This example reveals that ditridecyl thiodipropionate (DTDTDP) has no substantial effect on gel time or peak time, but suppresses the exothermic energy and temperature.

EXAMPLE 3

Laminate Barcol Hardness Build Up

Two sets of laminates were constructed using a fiberglass chopped strand mat in which individual strands are coated with a binder, chopped to ¼-4 inches and compressed to form a mat. This material was obtained from Owens Corning Fiberglass Company. This mat was impregnated with prepromoted resins (30% chopped strand mat and 70% resin). One resin was Altek 52 and the other was Altek 80-70 LV both of which are unsaturated polyester resins. Each resin was catalyzed with methyl ethyl ketone peroxide at 1% by wt. of to polymerize at 77° F. In one set 0.5% by wt. of the resins of ditridecyl thiodipropionate (DTDTDP) was added to each resin, and in the other set, the control was free of thioester.

The Barcol Hardness build up of laminate against time was measured to indicate the progression of polymerization and ultimate degree of polymerization. Barcol hardness was measured using a 934 to 1 Barcol gauge No. 931-1

The Barcol measurement results were as follows:

| | Altek 52 (ambient temp. 70° F.) | |
|---|---|---|
| Time | Control | DTDTDP |
| 1 hr | none | flicker |
| 1 hr 5 min | flicker | 5-10 |
| 1 hr 15 min | 10-15 | 10-20 |
| 1 hr 30 min | 10-20 | 15-20 |
| 2 hr | 20-35 | 20-30 |
| 24 hr | 30-40 | 30-40 |

| | Altek 80-70 LV (ambient temp. 66° F.) | |
|---|---|---|
| Time | Control | DTDTDP |
| 1 hr | none | flicker |
| 1 hr 10 min | flicker | 5-10 |
| 1 hr 30 min | 10-15 | 10-20 |
| 2 | 10-15 | 15-20 |
| 5 hr | 25+ | 25-30 |

The above data indicates that ditridecyl thiodipropionate (DTDTDP) does not affect the polymerization rate and ultimate degree of polymerization.

EXAMPLE 4

Effect on Color of Product 100 gm of unsaturated polyester resin which is used in color critical applications, Altek 59 from Alpha Chemical Corporation, with and without 0.5% by weight of the resin of ditridecyl thiodipropionate (DTDTDP), respectively, was polymerized. The resin with ditridecyl thiodiprioponate yielded a very clear and crack free casting indicating its thermal oxidation resistance properties result in a lighter color resin matrix.

EXAMPLE 5

Effect on Bulk Molding Compound Material

Two batches of bulk molding compound with and without ditridecyl thiodipropionate were made using 1% by wt. of the resin of ditridecyl thiodipropionate (DTDTDP) based on the resin. The composition of these two batches were respectively:

| | wt % | wt % |
|---|---|---|
| MR 14019 (unsaturated polyester resin) | 15 | 15 |
| polystyrene | 3 | 3 |
| polyethylene | 1 | 1 |
| tertbutylperbenzoate | .19 | .19 |
| ditridecyl thiodipropionate | — | .19 |
| calcium stearate | 1 | 1 |
| titanium dioxide | 2 | 2 |

-continued

|  | wt % | wt % |
|---|---|---|
| calcium carbonate | 70 | 70 |
| chopped fiberglass ¼" | 8 | 8 |

The compound containing ditridecyl thiodipropionate exhibited better degrees of wet out for the filler reinforcement than the control. Both compounds molded similarly. It was observed that the ditridecyl thiodipropionate resulted in better color depth and a smoother surface.

EXAMPLE 6

Redox Initiated Polymerization

The same resins were polymerized as set forth in Example 1, except that instead of the ditridecyl thiodipropionate (DTDTDP), 0.5% by weight of the resins of dimethyl thiodipropionate (DMTDP) was added.

The results were as follows:

|  | Altek 52 | | Altek 80-70 LV | |
|---|---|---|---|---|
|  | Control | DMTDP | Control | DMTDP |
| Gel Time | 10 min. | 9 min. | 10 min. | 11 min. |
| Peak Time | 19 min. | 18 min. | 19 min. | 20 min. |
| Peak Temp. | 335° F. | 248° F. | 340° F. | 245° F. |

This example reveals that dimethyl thiopropionate (DMTDP) has no substantial effect on either gel or peak times, but substantially suppresses exothermic energy and temperature even to a greater extent than DTDTDP.

EXAMPLE 7

Thermally Decomposed Free Radial Polymerization

The same resins were polymerized as set forth in Example 2, except that instead of the ditridecyl thiodipropionate (DTDTDP), 0.5% by weight of the resins of dimethyl thiodipropionate (DMTDP) was added.

The results were as follows:

| | SPI Reactivity | | | |
|---|---|---|---|---|
| | Unsaturated Polyester | | Vinyl Ester | |
| | Control | DMDPT | Control | DMTDP |
| Gel Time | 4 min | 4 min 30 sec | 5 min. 36 sec. | 6 min. |
| Peak Time | 90 sec | 105 sec | 130 sec | 142 sec |
| Peak Temp. | 432° F. | 350° F. | 427° F. | 345° F. |

This example reveals that dimethyl thiodipropionate (DMTDP) has no substantial effect on either gel or peak times, but substantially suppresses exothermic energy and temperature even to a greater extent than even DTDTDP.

EXAMPLE 8

Laminate Barcol Hardness Build Up

The same resins were polymerized as set forth in Example 3, except that instead of the ditridecyl thiodipropionate (DTDTDP), 0.5% by weight of the resins of dimethyl thiodipropionate (DMTDP) was added.

The results were as follows:

| Altek 52 (Ambient temp. 70° F.) | | |
|---|---|---|
| Time | Control | DMTDP |
| 40 min | 0-10 | 0-5 |
| 50 min | 10-15 | 5-10 |
| 60 min | 10-20 | 10-20 |
| 90 min | 20-30 | 20-25 |
| 2 hr | 20-40 | 20-38 |
| 24 hr | 30-40 | 30-40 |

| Altek 80-70 LV (Ambient temp. 70° F.) | | |
|---|---|---|
| Time | Control | DMTDP |
| 90 min | flicker | flicker |
| 105 min | 5-10 | 5-10 |
| 2 hr | 10-15 | 10-20 |
| 3 hr | 10-25 | 10-25 |
| 24 hr | 25-40 | 25-40 |

The above data indicate that dimethyl thiodipropionate (DMTDP) does not affect the polymerization rate and ultimate degree of polymerization.

EXAMPLE 9

Effect on Color of Product

The same resin was polymerized as set forth in Example 4, except that instead of the ditridecyl thiodipropionate (DTDTDP), dimethyl thiodipropionate (DMTDP) was added. The performance of the DMTDP was at least as good as in Example 4.

EXAMPLE 10

Effect on Bulk Molding Compound Material

The same resin composition was polymerized as set forth in Example 5, except that instead of the ditridecyl thiodipropionate (DTDTDP), 1.0% by weight of the resin of dimethyl thiodipropionate (DMTDP) was added. As in Example 5, both compounds molded similarly. However, even better color depth and wetting of the filler reinforcement was observed with the DMTDP.

It will be understood that the embodiments of the invention which have been described are merely illustrative of the principles of the present invention. Numerous modifications may be made by those skilled in the art without departing from the true spirit and scope of the invention.

I claim:

1. A polymerizable resin composition comprising:
   at least one polymerizable resin which undergoes exothermic polymerization and which is selected from the group consisting essentially of at least one unsaturated monomer and unsaturated polyester resins, vinyl ester resins and mixtures thereof; and
   a substantially non-polymeric ester of a thiocarboxylic acid mixed with said resin in an effective amount to substantially reduce the exothermic heat generated during free radical polymerization of said resin, but insufficient to substantially reduce the exothermic heat generated during free radical polymerization of said resin, but insufficient to substantially affect the degree or rate of free radical polymerization of said resin, said ester of a thiocarboxylic acid having the formula

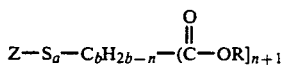

in which Z is an alkyl having 1-18 carbon atoms or Z is

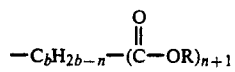

and where a is 1, b is a whole number from 1 to about 5, n is a whole number from zero to b, and R is an alkyl or hydroxyalkyl having 1-18 carbon atoms and zero to 2 hydroxyl groups, alkyloxyethyl, alkyloxyethoxyethyl, and alkyloxypolyethoxyethyl having 1 to about 30 carbon atoms in the alkyl group; or when n is zero and Z is alkyl, R is

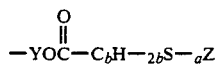

in which Y is an alkylene group having 2 to about 20 carbon atoms or an alkylene group interrupted at intervals or 2 or more carbon atoms by oxygen atoms and having 4 to about 40 carbon atoms and one to 19 oxygen atoms.

2. The composition of claim 1, wherein Z is

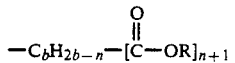

and R is methyl or tridecyl.

3. The composition of claim 1, wherein said ester of a thiocarboxylic acid is a thiopropionate.

4. The composition of claim 3, wherein said thiopropionate is a thiodipropionate.

5. The composition of claim 1, wherein said ester of a thiocarboxylic acid is ditridecyl thiodiproprionate.

6. The composition of claim 1, wherein said ester of thiocarboxylic acid is dimethyl thiodipropionate.

7. The composition of claim 1, wherein said ester of a thiocarboxylic acid is present in an amount of about 0.001-5.0% by weight of the resin.

8. The composition of claim 7, wherein said ester of a thiocarboxylic acid is present in an amount of about 0.5-1.0% by weight of the resin.

9. The composition of claim 4, wherein said ester of a thiocarboxylic acid is present in an amount of about 0.001-5.0% by weight of the resin.

10. The composition of claim wherein said ester of a thiocarboxylic acid is present in an amount of about 0.5-1.0% by weight of the resin.

11. The composition of claim 5, wherein said ester of a thiocarboxylic acid is present in an amount of about 0.001-5.0% by weight of the resin.

12. The composition of claim 11, wherein said ester of a thiocarboxylic acid is present in an amount of about 0.5-1.0% by weight of the resin.

13. The composition of claim 6, wherein said ester of a thiocarboxylic acid is present in an amount of about 0.001-5.0% by weight of the resin.

14. The composition of claim 13, wherein said ester of a thiocarboxylic acid is present in an amount of about 0.5-1.0% by weight of the resin.

15. A method of reducing the exothermic heat generated during the free radical polymerization of a polymerizable resin which undergoes exothermic polymerization and which is selected from the group consisting essentially of at least one unsaturated monomer and an unsaturated polyester resin, a vinyl ester resin and mixtures thereof, said method comprising:

mixing a substantially non-polymeric ester of a thiocarboxylic acid with the resin in an effective amount to substantially reduce the exothermic heat generated during polymerization of said resin, but insufficient to substantially affect the degree or rate of polymerization of the resin, said ester of a thiocarboxylic acid having the formula

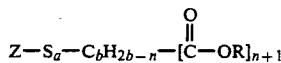

in which Z is an alkyl having 1-18 carbon atoms or Z is

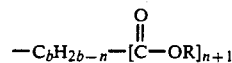

and where a is 1, b is a whole number from 1 to about 5, n is a whole number from zero to b, and R is an alkyl or hydroxyalkyl having 1-18 carbon atoms and zero to 2 hydroxyl groups, alkyloxyethyl, alkyloxyethoxyethyl, and alkyloxypolyethoxyethyl having 1 to about 30 carbon atoms in the alkyl group; or when n is zero and Z is alkyl, R is

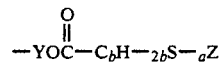

in which Y is an alkylene group having 2 to about 20 carbon atoms or an alkylene group interrupted at intervals of 2 or more carbon atoms by oxygen atoms and having a 4 to about 40 carbon atoms and one to 19 oxygen atoms;

generating free radicals in the mixture to initiate the polymerization of the resin; and polymerizing the resin in the presence of said ester.

16. The method of claim 15, wherein Z is

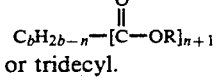

and R is methyl or tridecyl.

17. The method of claim 15, wherein said ester of a thiocarboxylic acid is a thiopropionate.

18. The method of claim 17, wherein said thiopropionate is a thiodipropionate.

19. The method of claim 15, wherein said ester of a thiocarboxylic acid is ditridecyl thiodiproprionate.

20. The method of claim 15, wherein said ester of thiocarboxylic acid is dimethyl thiodipropionate.

21. The method of claim 15, wherein said ester of a thiocarboxylic acid is present in an amount of about 0.001-5.0% by weight of the resin.

22. The method of claim 21, wherein said ester of a thiocarboxylic acid is present in an amount of about 0.5-1.0% by weight of the resin.

23. The method of claim 18, wherein said ester of a thiocarboxylic acid is present in an amount of about 0.001–5.0% by weight of the resin.

24. The method of claim 23, wherein said ester of a thiocarboxylic acid is present in an amount of about 0.5–1.0% by weight of the resin.

25. The method of claim 19, wherein said ester of a thiocarboxylic acid is present in an amount of about 0.001–5.0% by weight of the resin.

26. The method of claim 25, wherein said ester of a thiocarboxylic acid is present in an amount of about 0.5–1.0% by weight of the resin.

27. The method of claim 20, wherein said ester of a thiocarboxylic acid is present in an amount of about 0.001–5.0% by weight of the resin.

28. The method of claim 27, wherein said ester of a thiocarboxylic acid is present in an amount of about 0.5–1.0% by weight of the resin.

29. The polymerized product of claim 15.
30. The polymerized product of claim 18.
31. The polymerized product of claim 19.
32. The polymerized product of claim 20.
33. The polymerized product of claim 21.

* * * * *

UNITED STATES PATENT AND TRADEMARK OFFICE
CERTIFICATE OF CORRECTION

PATENT NO. : 5,286,788
DATED : February 15, 1994
INVENTOR(S) : Shahid

It is certified that error appears in the above-indentified patent and that said Letters Patent is hereby corrected as shown below:

Title Page, In the Abstract, line 19, delete "z" and insert --Z--.

In col. 9, line 1 (the first of the 4 formulas), delete "$O[CH_2CH_2OCH_2O\overset{O}{\overset{\|}{C}}CH_2CH_2SC_8H_{17}]_2$"

and insert --$O[CH_2CH_2OCH_2CH_2O\overset{O}{\overset{\|}{C}}CH_2CH_2SC_8H_{17}]_2$--.

In col. 9, line 15, (the last of the 4 formulas), delete

"$[HOCH_2O\overset{O}{\overset{\|}{C}}CH_2]_2S$" and insert --$[HOCH_2CH_2O\overset{O}{\overset{\|}{C}}CH_2]_2S$--.

UNITED STATES PATENT AND TRADEMARK OFFICE
CERTIFICATE OF CORRECTION

PATENT NO. : 5,286,788
DATED : February 15, 1994
INVENTOR(S) : Shahid

It is certified that error appears in the above-indentified patent and that said Letters Patent is hereby corrected as shown below:

In claim 1, col. 17, line 27, delete "or" and insert --of--.

In claim 5, col. 17, line 42, delete "thiodiproprionate" and insert --thiodipropionate--.

In claim 10, col. 17, line 54, after "claim" insert --9--.

In claim 15, col. 18, line 43, delete "a".

In col. 10, line 24, delete "resins," and insert --resin's--.

In claim 1, col. 16, lines 63-65, delete

"but insufficient to substantially reduce the exothermic heat generated during free radical polymerization of said resin,".

Signed and Sealed this

Eleventh Day of April, 1995

Attest:

BRUCE LEHMAN

Attesting Officer

Commissioner of Patents and Trademarks